(12) United States Patent
Catonnet et al.

(10) Patent No.: US 10,827,764 B2
(45) Date of Patent: Nov. 10, 2020

(54) PRESSURIZED SPRAY DEVICE CONTAINING A LOW FAT FERMENTED DAIRY PRODUCT

(71) Applicant: COMPAGNIE GERVAIS DANONE, Paris (FR)

(72) Inventors: Guillaume Catonnet, Massy (FR); Laurent Schmitt, Igny (FR); Paula Montes Cuevas, Puente San Miguel (ES); Esther Sanmartin Sierra, Vitoria-gasteiz (ES); Izaskun Perez Simon, Vitoria-gasteiz (ES); Iñigo Martinez De Maranon Ibabe, Bilbao (ES)

(73) Assignee: COMPAGNIE GERVAIS DANONE, Paris (FR)

( * ) Notice: Subject to any disclaimer, the term of this patent is extended or adjusted under 35 U.S.C. 154(b) by 67 days.

(21) Appl. No.: 15/329,616

(22) PCT Filed: Jul. 28, 2014

(86) PCT No.: PCT/IB2014/001537
§ 371 (c)(1),
(2) Date: Jan. 27, 2017

(87) PCT Pub. No.: WO2016/016678
PCT Pub. Date: Feb. 4, 2016

(65) Prior Publication Data
US 2017/0215448 A1    Aug. 3, 2017

(51) Int. Cl.
*A23C 9/137*    (2006.01)
*A23C 9/13*    (2006.01)
*A23C 9/123*    (2006.01)

(52) U.S. Cl.
CPC ............ *A23C 9/1307* (2013.01); *A23C 9/123* (2013.01); *A23C 9/137* (2013.01); *A23C 9/1315* (2013.01); *A23C 2240/20* (2013.01); *A23C 2270/10* (2013.01); *A23V 2002/00* (2013.01); *A23V 2250/11* (2013.01)

(58) Field of Classification Search
CPC .......... A23V 2002/00; A23V 2200/226; A23V 2200/222; A23V 2200/242; A23V 2250/50724; A23V 2250/5072; A23V 2250/10; A23V 2300/04; A23V 2250/11; A61K 2800/48; A61K 35/744; A61K 35/747; A61K 35/742; A61K 35/745; A61K 9/122; A23C 2210/30; A23C 9/1307; A23C 9/137; A23C 9/1524; A23C 2240/20; A23C 2270/10; A23C 9/1238; A23C 21/026; A23C 21/06; A23L 1/29; B65D 83/14

See application file for complete search history.

(56) References Cited

U.S. PATENT DOCUMENTS

| | | | | |
|---|---|---|---|---|
| 3,178,075 A | * | 4/1965 | Riedl | B65D 83/625 169/73 |
| 4,851,239 A | * | 7/1989 | Amen | A23C 9/1524 426/43 |
| 2003/0068406 A1 | * | 4/2003 | Nair | A23C 9/1322 426/34 |
| 2007/0065555 A1 | | 3/2007 | Soane et al. | |
| 2010/0233317 A1 | * | 9/2010 | Peterson | A23C 9/1232 426/34 |
| 2014/0093612 A1 | * | 4/2014 | Montserrat Carreras | A23C 9/123 426/43 |

FOREIGN PATENT DOCUMENTS

| | | |
|---|---|---|
| CH | 676908 A5 | 3/1991 |
| DE | 486532 C | 11/1929 |
| ES | 2302574 A1 | 7/2008 |

OTHER PUBLICATIONS

Database GNPD [Online] Mintel, "Yoghurt Style Whipped Topping," Database Accession No. 1038717, XP002737186, Jan. 2009, pp. 1-2.
International Search Report (Form PCT/ISA/210), dated Mar. 26, 2015, for International Application No. PCT/IB2014/001537.

* cited by examiner

*Primary Examiner* — Hong T Yoo
(74) *Attorney, Agent, or Firm* — Birch, Stewart, Kolasch & Birch LLP

(57) ABSTRACT

The present invention relates to a pressurized spray device containing: a propellant gas, and—a fermented dairy product comprising an emulsifier and a stabilizer and having: • a fat content comprised between 1 and 6%, and • a total protein content of at least 3%, capable of spraying out the fermented dairy product to form a fermented dairy product foam, as well as a method to produce such a device and a method for obtaining a fermented dairy product foam.

19 Claims, 1 Drawing Sheet

(a)

(b)

(c)

PRESSURIZED SPRAY DEVICE CONTAINING A LOW FAT FERMENTED DAIRY PRODUCT

Figure 1:
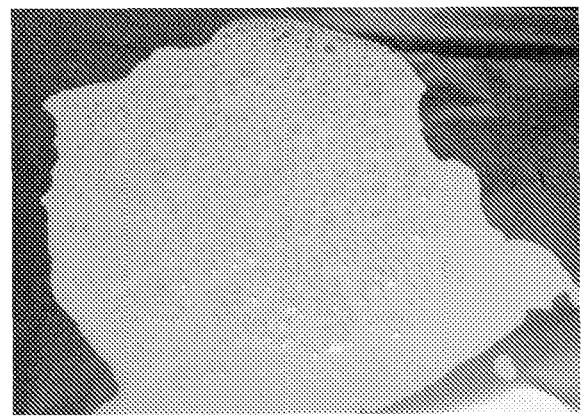
Figure 1:
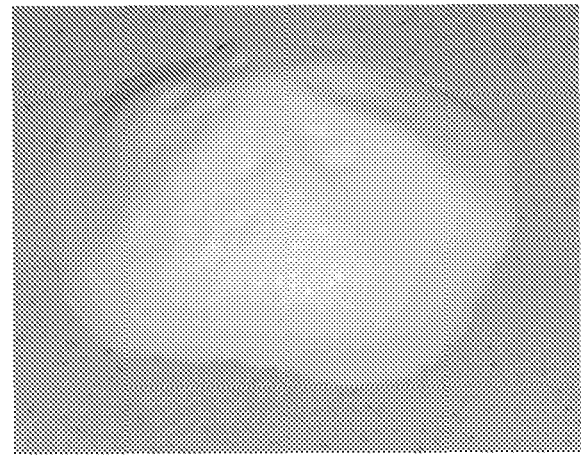
Figure 1:
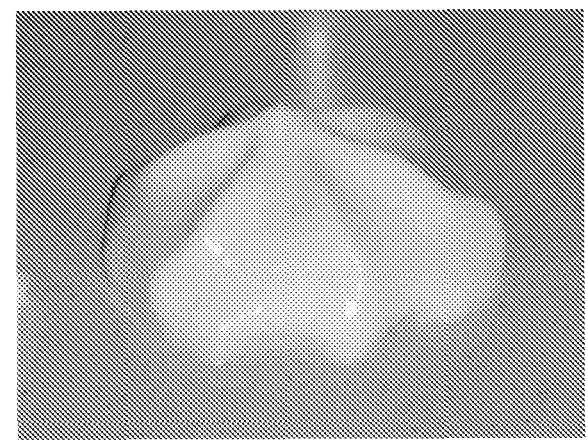

The present invention relates to a pressurized spray device containing a low fat fermented dairy product capable of spraying out the fermented dairy product to form a stable fermented dairy product foam, as well as a method to produce such a device.

In view of the large amount of fermented dairy products consumed by consumers, there is always an interest in providing new fermented dairy products with various forms, tastes or textures.

Moreover, dairy products are known to be good for the health of consumers, especially children. Thanks to the calcium contained in such products, there is an interest to find new and attractive formulations of fermented dairy products, to incite them to eat more dairy products.

There is in particular an interest in replacing whipped cream which has a high fat content (about 30%) with a whipped product based on a fermented dairy product. The patent application ES 2 302 574 describes notably such a foam obtained from a fermented dairy product. However, in order to obtain a stable foam, the fermented dairy product has to have a fat content of at least 10% and preferably of between 15% and 25%.

There exists thus a need for a whipped product based on a low fat fermented dairy product.

The present invention provides thus a pressurized spray device containing a low fat fermented dairy product capable of spraying out the fermented dairy product to form a fermented dairy product foam which is sufficiently firm to remain stable at least 10 minutes after its formation, which is the time requires in practice.

The present invention relates thus to a pressurized spray device containing:
a propellant gas, and
a fermented dairy product comprising an emulsifier and a stabilizer and having:
  a fat content comprised between 1 and 6%, and
  a total protein content of at least 3%,
capable of spraying out the fermented dairy product to form a fermented dairy product foam.

Indeed, the inventors have surprisingly discovered that the total protein content of the low fat fermented dairy product has to be sufficiently high to allow obtaining a stable foam.

Fermented Dairy Product:

In the context of the present invention, "fermented dairy product" designates more particularly a fermented dairy product ready for human consumption, such as a fermented milk, a yoghurt, or a fresh cheese such as a white cheese or a petit-suisse. It can be also a strained fermented dairy product such as a strained yoghurt also called concentrated yoghurt or Greek-style yoghurt.

The terms "fermented milk" and "yoghurt" are given their usual meanings in the field of the dairy industry, that is, products destined for human consumption and originating from acidifying lactic fermentation of a milk substrate. These products can contain secondary ingredients such as fruits, vegetables, sugar, etc.

The expression "fermented milk" is thus reserved in the present application for a dairy product prepared with a milk substrate which has undergone treatment at least equivalent to pasteurisation, seeded with microorganisms belonging to the characteristic species or species of each product.

The term "yoghurt" is reserved for fermented milk obtained, according to local and constant usage, by the development of specific thermophilic lactic bacteria known as *Lactobacillus delbrueckii* subsp. *bulgaricus* and *Streptococcus thermophilus*, which must be in the living state in the finished product, at a minimum rate. In certain countries, regulations require the addition of other lactic bacteria to the production of yoghurt, and especially the additional use of strains of *Bifidobacterium* and/or *Lactobacillus acidophilus* and/or *Lactobacillus casei*. These additional lactic strains are intended to impart various properties to the finished product, such as that of favouring equilibrium of intestinal flora or modulating the immune system. The yoghurt will be more particularly a stirred yoghurt or a drinking yoghurt in the framework of the present invention.

In practice, the expression "fermented milk" is therefore generally used to designate fermented milks other than yoghurts. It can also, according to country, be known by names as diverse as, for example, "Kefir", "Kumtss", "Lassi", "Dahi", "Leben", "Filmjolk", "Villi", "Acidophilus milk".

Finally, the name "white cheese" or "petit-Suisse" is, in the present application, reserved for unrefined non-salty cheese, which has undergone fermentation by lactic bacteria only (and no fermentation other than lactic fermentation).

The fermented dairy product is made from whole milk and/or wholly or partly skimmed milk, which can be used in a powder form which can be reconstituted by addition of water. Other milk components can be added such as cream, casein, caseinate (for ex. calcium or sodium caseinate), whey proteins notably in the form of a concentrate (WPC), milk proteins notably in the form of a concentrate (MPC), milk protein hydrolysates and mixtures thereof.

The milk and milk components has typically an animal origin such as a cow, goat, sheep, buffalo, donkey or camel origin.

The fermented dairy product used in the present invention contains an emulsifier which can be in particular lactic acid esters of mono- and di-glycerides (LACTEM-E472b), lecithin, mono- and di-glycerides of fatty acids (E471) or acetic acid esters of mono- and di-glycerides of fatty acids (AC-ETEM-E472a), in particular lactic acid esters of mono- and di-glycerides (LACTEM-E472b).

The fermented dairy product contains advantageously 0.1 to 2 wt %, preferably 0.2 to 1 wt %, of this emulsifier relatively to the total weight of the fermented dairy product.

The fermented dairy product used in the present invention contains also a stabilizer which can be in particular pectin such has low methyl (LM), high methyl (HM) or hydrolysed pectin, and notably LM pectin.

The fermented dairy product contains advantageously 0.1 to 5 wt %, preferably 0.2 to 1 wt %, more preferably 0.2 to 0.5% of this stabilizer relatively to the total weight of the fermented dairy product.

Other food additives can be present, in addition to the emulsifier and the stabiliser, notably chosen among:
  sugars and sweeteners:
    sugars and sweeteners are food-acceptable carbohydrate sweetening agents that may be natural or artificial, no or low calorie sweeteners;
    preferred examples of appropriate sugars are sucrose, fructose, lactose, glucose and maltose. Such sugars can be incorporated in the form of beet sugar, cane sugar, maple sugar, molasses, corn syrup, malt syrup, maple syrup, agave nectar or also honey;
    preferred examples of appropriate no or low calorie sweeteners are aspartame, sucralose, acesulfame potassium, saccharin, sodium cyclamate, thaumatin, tagatose, neohesperidin dihydrochalcone, isomaltulose, rebaudioside A or also a stevia extract (containing rebaudioside A), vitamins (e.g. vitamin A, B1, B2, B6, B12, C, D, E or K, folic acid, etc.), anti-oxidants, pH-modifying agents (e.g. buffering agents or acidifying agents such as citric acid and its salts, for ex. sodium, potassium or calcium citrate), lubricants (e.g. vegetable oils), preservatives (e.g. sorbic acid and its salts such as sodium, potassium and calcium salts, sulphur dioxide, benzoic acid and its salts such as sodium, potassium and calcium salts, ethyl, methyl or propyl p-hydroxybenzoate, etc.), taste exhausters (e.g. glutamic acid and its salts such as sodium, potassium, calcium, magnesium or ammonium salts), texturizing agents:
  texturizing agents are used to modify the overall texture or mouthfeel of a food product and include hydrocolloids as gelling agents (for ex. gelatine, agar, carrageenan, natural gums) and thickeners (for ex. guar gum, xanthan gum, starch, agar, carrageenan, alginic acid, polydextrose), flavouring aromatic agents of synthetic or natural origin (e.g. fruit flavours or aroma of vanillia, chocolat or caramel), preparation of fruit (e.g. cherry, mango preparation) and salty preparation (herbs, garlic), and colouring agents (pigments, dyes, etc.).

If need be, the skilled artisan will be able to choose appropriate food additives among all the well-known food additives and excipients available on the market.

These food additives, including the emulsifier and the stabiliser, can be added before or after the fermentation step allowing the preparation of the fermented dairy product from a non-fermented dairy product, sometimes named the white mass, containing thus milk and milk components and optionally other food additives.

These food additives, including the emulsifier and the stabiliser, can also be added in a cream preparation before mixing this cream preparation with the fermented dairy product.

The fermented dairy product is generally obtained from a non-fermented dairy product by a first pasteurisation step, followed by a lactic fermentation step.

To perform such a lactic fermentation, lactic ferments are added to the pasteurised non-fermented dairy product.

In the framework of the present invention, various ferments can be used for performing the fermentation of the dairy product and in particular a culture of lactic acid bacteria such as:

*Lactobacillus* sp. (for ex. *Lactobacillus bulgaricus, Lactobacillus acidophilus, Lactobacillus paracasei, Lactobacillus casei, Lactobacillus pentosus, Lactobacillus helveticus, Lactobacillus reuteri, Lactobacillus plantarum, Lactobacillus bifidus* and combinations thereof),

*Lactococcus* sp. (for ex. *Lactococcus lactis*),

*Bifidobacterium* sp. (for ex. *Bifidobacterium bifidum, Bifidobacterium infantis, Bifidobacterium animalis,* especially *Bifidobacterium animalis* subsp. *lactis, Bifidobacterium breve, Bifidobacterium longum* and combinations thereof), and

*Streptococcus* sp. (for ex. *Streptococcus thermophilus, Streptococcus lactis, Streptococcus raffinolactis, Streptococcus cremoris* and combinations thereof).

Preferred lactic acid bacteria to be used in the present invention are selected from *Lactobacillus bulgaricus, Streptococcus thermophilus, Lactococcus lactis, Bifidobacterium animalis* subsp. *lactis,* and combinations thereof.

The ferments can be alive or dead in the fermented dairy product used in the present invention.

The "fat content" of the fermented dairy product corresponds to the weight of the fat components present in the fermented dairy product relatively to the total weight of the fermented dairy product. The fat content is expressed as a weight percentage.

The fat content can be measured by the Weibull-Berntrop gravimetric method described in the standard NF ISO 8262-3.

If the fat content is known for all the ingredients used to prepare the fermented dairy product, the fat content of the fermented dairy product can be calculated from these data.

The fermented dairy product used in the present invention has a fat content of between 1 and 6 wt %, notably between 2.5 and 5 wt %, in particular between 3 and 4 wt %.

The "total protein content" of the fermented dairy product corresponds to the weight of the proteins present in the fermented dairy product relatively to the total weight of the fermented dairy product. The total protein content is expressed as a weight percentage.

The total protein content can be measured by Kjeldahl analysis (NF EN ISO 8968-1) as the reference method for the determination of the protein content of dairy products based on measurement of total nitrogen. Nitrogen is multiplied by a factor, typically 6.38, to express the results as total protein. The method is described in both AOAC Method 991.20 (1) and international Dairy Federation Standard (IDF) 20B:1993.

If the total protein content is known for all the ingredients used to prepare the fermented dairy product, the total protein content of the fermented dairy product can be calculated from these data.

The fermented dairy product used in the present invention has a total protein content of at least 3 wt %, notably between 3 and 20 wt %, preferably between 3 and 10 wt %, more preferably between 3.6 and 6%, and even more preferably between 4.5 and 5.5%.

If the total protein content is below 3 wt % the foam obtained by spraying out the fermented dairy product from the pressurized spray device is not sufficiently stable.

Advantageously, the pH of the fermented dairy product used in the pressurized spray device according to the present invention is comprised between 3.8 and 4.75, notably between 4.2 and 4.6, during all the shelf life of the fermented dairy product (i.e. about 9 weeks after the fermentation step).

For that, if the ferments are not killed after the fermentation step, the pH of the fermented dairy product should be advantageously comprised between 4.6 and 4.75, at the end of the fermentation step. Indeed, if the ferments are still alive in the fermented dairy product, the pH will continue to decrease with time in the fermented dairy product.

Advantageously, the Dornic acidity of the fermented dairy product used in the pressurized spray device according to the present invention is comprised between 85 and 140° D, notably between 90 and 120° D, during all the shelf life of the fermented dairy product (i.e. about 9 weeks after the fermentation step).

For that, if the ferments are not killed after the fermentation step, the Dornic acidity of the fermented dairy product should be advantageously comprised between 85 and 100° D, at the end of the fermentation step. Indeed, if the ferments are still alive in the fermented dairy product, the Dornic acidity will continue to increase with time in the fermented dairy product.

The Dornic acidity is measured by titration using an aqueous solution of sodium hydroxide N/9 (0.111 mol/L) and a 2% phenolphthalein alcohol solution as an indicator. Two drops of the phenolphthalein solution are added to 10 mL of the fermented dairy product and then the sodium hydroxide solution is added drop by drop until obtaining a pale pink color. The amount of sodium hydroxide solution (mL) thus added is multiplied by 10 to get the Dornic acidity.

Advantageously, the viscosity of the fermented dairy product used in the pressurized spray device according to the present invention is comprised between 20 and 1000 mPa·s, notably between 100 and 700 mPa·s, more preferably between 250 mPa·s and 500 mPa·s, during all the shelf life of the fermented dairy product (i.e. about 9 weeks after the fermentation step).

If the viscosity is below 20 mPa·s, the final foam will not be sufficiently firm to stay stable during at least 10 minutes.

If the viscosity is above 1000 mPa·s, there will remain too much fermented dairy product in the pressurized spray device (at least 15 wt %) which could not have been sprayed out which represents an inacceptable loss.

The viscosity is measured by a rheomat RM 200 from the Lamy's company. A rotation of a cylinder is activated into a dairy product at 10° C. introduced in a stator part. Parameters used are stator/rotor reference 2/2, speed 64 $s^{-1}$, duration 10 s. The viscosity is expressed in mPa·s. The measure of viscosity at 10° C. requires a storage of the fermented dairy product at 10° C. during 4 hours before use.

The fermented dairy product is more particularly a refrigerated fermented dairy product, i.e. it is stored at a refrigeration temperature. This refrigeration temperature in particular is of between 0 and 10° C., notably between 1 and 8° C., preferably between 2 and 6° C.

Pressurized Spray Device:

The pressurized spray device can be any pressurized spray device which can be used typically to prepare whipped cream.

The pressurized spray device comprises in particular a can, a valve, an actuator and generally a cap.

The can is the container part of the device intended to contain the fermented dairy product and the propellant gas in the present case. It can have various shapes and can be made in various materials such as tin-plate, aluminium, stainless steel or plastic.

The valve allows keeping the container airtight, while regulating the flow of the fermented dairy product outside the pressurized device.

The actuator is the part of the pressurized spray device which is pressed to allow spraying out the fermented dairy product from the pressurized device. It can have different shapes allowing to control notably the angle, amount and shape of the fermented dairy product spray.

The cap allows covering and thus protecting the actuator.

The pressurized spray device can be in particular an aerosol or a food siphon.

The pressure in the device is advantageously comprised between 6 and 15 bars, notably between 6 and 11 bars.

A higher pressure allows improving the lightness of the foam by increasing the quantity of gas trapped in the foam (expansion rate), maintaining firmness of the foam during the serving and reducing the loss of fermented dairy product in spray device.

Propellant Gas:

The propellant gas can be any propellant gas used commonly in pressurized spray device used in food industry. It can be in particular $N_2$, $N_2O$, $CO_2$ or a mixture thereof, preferably $N_2O$, $CO_2$ or a mixture thereof.

According to a particular embodiment, the propellant gas contains $CO_2$, and notably is a mixture of $N_2O$ and $CO_2$. Indeed, the inventors of the present invention have discovered that the use of $CO_2$ as at least a portion of the propellant gas allows improving the freshness feeling in mouth of the fermented dairy product foam.

In particular, the propellant gas can contain at least 10% in mass, notably between 20% and 40% in mass, of $CO_2$.

Foam:

The present invention relates also to a method for obtaining a fermented dairy product foam by spraying out the fermented dairy product from the pressurized spray device according to the invention.

The foam obtained after spraying out the fermented dairy product from the pressurized spray device should stay stable during at least 10 minutes as topping.

For that the foam should be sufficiently firm. The firmness of the foam can be quantified through the measure of the strength in gram (g).

The strength in g can be measured as follows. The foam to be tested is placed in a pot of 50 mm of diameter. The overflow is removed. An analyser of texture (for ex. TAXT+) equipped with a disk of 40 mm of diameter is then used to measure the strength in G which corresponds to the penetration force which has to be applied to allow the disk to penetrate of a distance of 25 mm in the pot filled with the foam. The program's parameters of the analyser are as follows:

speed: 2 mm/s,
penetration distance: 25 mm.

Advantageously, the strength in g will be above 80, preferably above 100, more preferably above 150 to consider that he obtained foam is sufficiently stable.

Method:

The present invention also concerns a method to prepare a pressurized spray device according to the present invention comprising:

(1) providing a fermented dairy product comprising an emulsifier and a stabilizer and having:
 a fat content comprised between 1 and 6%, and
 a total protein content of at least 3%,
(2) providing a spray device which can be pressurized,
(3) filing the said spray device with the said fermented dairy product, and
(4) adding a propellant gas to obtained the pressurized spray device.

The fermented dairy product can be prepared by any common technique used from a non-fermented dairy product. In particular, it can be prepared by the following steps:
 pasteurising the non-fermented dairy product, and
 fermenting the pasteurised non-fermented dairy product in the presence of lactic bacteria (lactic ferments).

The non-fermented dairy product generally is obtained by mixing together all the ingredients of the dairy product.

The pasteurisation step is a heating treatment at a temperature comprised between 72° C. and 138° C., preferably during 2 seconds to 30 minutes. Such a step and its conditions are well known to the one skilled in the art.

A pre-heating step can be performed before the pasteurisation step, generally at a temperature comprised between 60° C. and 75° C. A homogenisation step can be performed after the pre-heating step but before the pasteurisation step, notably at a pressure between 100 and 350 bars. The homogenisation step can be performed in a single or double step. In the case of a double step, a different pressure is used in each of the two homogenisation steps.

The fermentation step is a lactic fermentation using techniques which are known to the skilled person.

When reference is made to a "lactic fermentation", this means an acidifying lactic fermentation which results in milk coagulation and acidification following the production of lactic acid which may be accompanied by the production of other acids, carbon dioxide and various substances such as exopolysaccharides (EPS) or aromatic substances, for example diacetyl and acetaldehyde.

To perform such a lactic fermentation, lactic ferments are added to the non-fermented dairy product, which has generally been pasteurized beforehand, and the temperature is kept between 25° C. and 44° C., preferably for 3 to 16 hours.

The lactic ferments can be in particular a culture of lactic acid bacteria such as:
- *Lactobacillus* sp. (for ex. *Lactobacillus bulgaricus, Lactobacillus acidophilus, Lactobacillus paracasei, Lactobacillus casei, Lactobacillus pentosus, Lactobacillus helveticus, Lactobacillus reuteri, Lactobacillus plantarum, Lactobacillus bifidus* and combinations thereof),
- *Lactococcus* sp. (for ex. *Lactococcus lactis*),
- *Bifidobacterium* sp. (for ex. *Bifidobacterium bifidum, Bifidobacterium infantis, Bifidobacterium animalis*, especially *Bifidobacterium animalis* subsp. *lactis, Bifidobacterium breve, Bifidobacterium longum* and combinations thereof), and
- *Streptococcus* sp. (for ex. *Streptococcus thermophilus, Streptococcus lactis, Streptococcus raffinolactis, Streptococcus cremoris* and combinations thereof).

Preferred lactic acid bacteria to be used in the present invention are selected from *Lactobacillus bulgaricus, Streptococcus thermophilus, Lactococcus lactis, Bifidobacterium animalis* subsp. *lactis*, and combinations thereof.

The lactic fermentation step is generally stopped when a pH of between 4.6 and 4.75 is reached. The fermentation can be stopped by cooling and/or breaking the fermented dairy product.

A smoothing step can be performed at the end of the fermentation step, notably by shearing (e.g. with a homogenisator or a rotor stator mixer) in order to obtain the required viscosity for the fermented dairy product.

It is also possible, after the fermentation step but before the smoothing step, to perform a thermal shock step to prepare the fermented dairy product in order to reduce the metabolic activity of lactic bacteria or to kill the lactic bacteria, in particular at a temperature from 50 to 65° C. during 1 to 10 min.

In a last step, the fermented dairy product is advantageously cooled to a refrigeration temperature which is its storage temperature. This refrigeration temperature in particular is of between 0 and 10° C., notably between 1 and 8° C., preferably between 2 and 6° C.

Thus, the fermented dairy product can be prepared in particular by the following steps:
- preheating the non-fermented dairy product,
- homogenizing the pre-heated non-fermented dairy product
- pasteurising, notably by a heat treatment, the homogenised pre-heated non-fermented dairy product,
- cooling the pasteurised non-fermented dairy product to the fermentation temperature,
- fermenting the pasteurised non-fermented dairy product (in particular by addition of the lactic ferment),
- optionally submitting the fermented dairy product to a thermal shock,
- smoothing the fermented dairy product, and
- cooling the fermented dairy product to a refrigeration temperature.

The filling of the spray device with the fermented dairy product, which can be prepared as described above, is advantageously done with a fermented dairy product having a temperature of between 0 and 10° C., notably between 2° C. and 8° C., preferably between 3° C. and 5° C.

The filling of the spray device with a fermented dairy product having such a temperature allows improving the firmness of the final foam.

FIGURE

FIG. 1 presents a picture of a "foam" obtained from (a) whole milk, (b) a non-fermented dairy product, and (c) a fermented dairy product according to the invention.

EXAMPLES

Unless otherwise stated, the fermented dairy products used in the following examples have been prepared according to the following process:
- mixing all the ingredients constituting the non-fermented dairy product (white mass) during about 1 h,
- pre-heating the white mass to about 65° C.,
- homogenizing the pre-heated white mass in a single step at a pressure of 100 bars during about 30-60 min,
- heating the white mass at 95° C. during 5 min,
- pre-cooling the pasteurised white mass to about 40° C.,
- adding the frozen preparation of lactic bacteria (Yomix ARO 1® from Danisco) and maintaining the mixture at about 40° C.,
- breaking the fermented dairy product when a pH of 4.7 is reached,
- smoothing the fermented dairy product using a rotor stator mixer at 40° C. during about 30-60 min, and
- cooling the fermented dairy product to about 4° C.

Unless otherwise stated, the pressurized spray device used in the following examples was a food siphon of total capacity of 500 mL. It was filled with 300 g of the fermented dairy product at a temperature of about 4° C. before being filled with a cartridge of 8 g of $N_2O$ as propellant gas.

The firmness of the foam is represented by the strength in g which was measured as follows. The strength in g can be measured as follows. The foam to be tested is placed in a pot of 50 mm of diameter. The overflow is removed. An analyser of texture (for ex. TAXT+) equipped with a disk of 40 mm of diameter is then used to measure the strength in G which corresponds to the penetration force which has to be applied to allow the disk to penetrate of a distance of 25 mm in the pot filled with the foam. The program's parameters of the analyser are as follows:
- speed: 2 mm/s,
- penetration distance: 25 mm.

Grinsted® LACTEM RQ 22 KOSHER from Danisco was used as emulsifier. It contains 95 wt % of lactic acid ester of mono- and di-glycerides (E472b) and 5 wt % of calcium silicate (E552).

1. Importance of the Fermentation Step

The following three products have been used in this example:

whole milk, a non-fermented dairy product, and a fermented dairy product.

The non-fermented and fermented dairy products have the following composition:

| Ingredients | wt % |
| --- | --- |
| Milk 0% | 82.70 |
| Cream 40% | 7.88 |
| Emulsifier (Grinsted ® LACTEM RQ 22 KOSHER from Danisco) | 0.30 |
| Stabiliser (LM pectin) | 0.10 |
| Sucrose | 9.00 |
| Ferment (Yomix ® ARO 1) | 0.02 |

The non-fermented dairy product was prepared by mixing all the ingredients, whereas the fermented dairy product was prepared as defined above.

Each of these three products has been placed in a food siphon in the conditions described above before being sprayed out. The pictures of the obtained "foams" are presented on FIG. 1 ((a) whole milk; (b) non-fermented dairy product; (c) fermented dairy product). It appears clearly that whole milk is not able to give a foam in these conditions. Moreover, the foam obtained with the non-fermented dairy product is not stable, contrary to the foam obtained with the fermented dairy product.

2. Influence of the Fat Content and the Total Protein Content

The following compounds have been compared in this example:

| Ingredients (wt %) | DP1* | DP2 | DP3 | DP4 |
| --- | --- | --- | --- | --- |
| Milk 0% | 42.87 | 82.70 | 82.50 | 82.08 |
| Skimmed milk powder | — | — | — | 1.50 |
| Cream 40% | 47.70 | 7.88 | 7.88 | 7.80 |
| Emulsifier (Grinsted ® LACTEM RQ 22 KOSHER from Danisco) | 0.30 | 0.30 | 0.30 | 0.30 |
| Stabiliser (LM pectin) | 0.10 | 0.10 | 0.30 | 0.30 |
| Sucrose | 9.00 | 9.00 | 9.00 | 6.00 |
| Milk protein concentrate (Promilk ® 852) | — | — | — | 2.00 |
| Ferment (Yomix ® ARO 1) | 0.02 | 0.02 | 0.02 | 0.02 |
| Fat content | 20.0% | 3.6% | 3.6% | 3.6% |
| Total protein content | 2.5% | 3.1% | 3.1% | 5.0% |

*reference example

Each of these four products has been placed in a food siphon in the conditions described above before being sprayed out. The firmness of the foam obtained has been measured as described previously. The results obtained are presented in the following table.

| | DP1 | DP2 | DP3 | DP4 |
| --- | --- | --- | --- | --- |
| Firmness (strength in g) | 158 ± 5 | 114 ± 7 | 168 ± 6 | 170 ± 12 |

This table shows that the firmness and thus the stability of the foam increase with the fat content. The firmness and thus the stability of a low fat fermented dairy product can then be increased by increasing the total protein content.

3. Various Examples According to the Present Invention

The following compounds have been prepared:

| Ingredients (wt %) | DP5 | DP6 | DP7 | DP8* |
| --- | --- | --- | --- | --- |
| Milk 0% | 79.09 | 74.81 | 75.67 | 81.93 |
| Skimmed milk powder | 1.50 | — | 7.10 | 1.50 |
| Cream 40% | 7.64 | 7.66 | 7.61 | 7.80 |
| Emulsifier (Grinsted ® LACTEM RQ 22 KOSHER from Danisco) | 0.30 | 0.30 | 0.30 | 0.30 |
| Stabiliser (LM pectin) | 0.30 | 0.30 | 0.30 | 0.30 |
| Lactose | 3.00 | 3.00 | 3.00 | — |
| Water | — | 5.00 | — | — |
| Sucrose | 6.00 | 6.00 | 6.00 | 6.00 |
| Milk protein concentrate (Promilk ® 852) | 2.15 | 2.91 | — | 2.15 |
| Ferment (Yomix ® ARO 1) | 0.02 | 0.02 | 0.02 | 0.02 |
| Fat content | 3.6% | 3.6% | 3.6% | 3.6% |
| Total protein content | 5.0% | 5.0% | 5.0% | 5.0% |

*A thermal shock step has been performed after the breaking step at a temperature of 58° C. during 2.5 min. The fermented dairy product is then cooled to 40° C.

Each of these products has been placed in a food siphon in the conditions described above before being sprayed out. The firmness of the foam obtained has been measured as described previously. The results obtained are presented in the following table.

| | DP6 | DP7 | DP8 | DP9 |
| --- | --- | --- | --- | --- |
| Firmness (strength in g) | 169 ± 4 | 181 ± 7 | 174 ± 6 | 150 ± 6 |

The invention claimed is:

1. A pressurized spray device comprising a can, a valve, an actuator and a cap, said pressurized spray device containing:
   a propellant gas, and
   a refrigerated fermented dairy product comprising an emulsifier and a stabilizer, having a temperature of between 0 and 10° C. and having:
      a fat content comprised between 2.5 and 5 wt %, and
      a total protein content comprised between 3 and 10 wt %,
wherein said pressurized spray device is capable of spraying out the fermented dairy product to form a fermented dairy product foam.

2. The pressurized spray device according to claim 1, wherein the refrigerated fermented dairy product is a refrigerated fermented milk or a yogurt.

3. The pressurized spray device according to claim 1, wherein the refrigerated fermented dairy product contains a ferment chosen among:
   *Lactobacillus* sp.,
   *Lactococcus* sp.,
   *Bifidobacterium* sp.,
   *Streptococcus* sp.,
   and mixtures thereof.

4. The pressurized spray device according to claim 3, wherein the ferment is chosen among *Lactobacillus bulgaricus, Lactobacillus acidophilus, Lactobacillus paracasei, Lactobacillus casei, Lactobacillus pentosus, Lactobacillus helveticus, Lactobacillus reuteri, Lactobacillus plantarum, Lactobacillus bifidus, Lactococcus lactis, Bifidobacterium bifidum, Bifidobacterium infantis, Bifidobacterium animalis, Bifidobacterium breve, Bifidobacterium longum, Streptococcus thermophilus, Streptococcus lactis, Streptococcus raffinolactis, Streptococcus cremoris* and combinations thereof.

5. The pressurized spray device according to claim 1, wherein the emulsifier is lactic acid esters of mono- and di-glycerides.

6. The pressurized spray device according to claim 1, wherein the refrigerated fermented dairy product contains 0.1 to 2 wt % of the said emulsifier relative to the total weight of the refrigerated fermented dairy product.

7. The pressurized spray device according to claim 1, wherein the stabilizer is a pectin.

8. The pressurized spray device according to claim 7, wherein the pectin is low methyl (LM), high methyl (HM) or hydrolysed pectin.

9. The pressurized spray device according to claim 1, wherein the refrigerated fermented dairy product contains 0.1 to 5 wt % of the said stabilizer relative to the total weight of the refrigerated fermented dairy product.

10. The pressurized spray device according to claim 1, wherein:
   the refrigerated fermented dairy product contains 0.2 to 1 wt % of the said emulsifier relative to the total weight of the refrigerated fermented dairy product,
   the refrigerated fermented dairy product contains 0.2 to 1 wt % of the said stabilizer relative to the total weight of the refrigerated fermented dairy product,
   the fat content of the refrigerated fermented dairy product is of between 3 and 4 wt %, and
   the total protein content of the refrigerated fermented dairy product is of between 3.6 and 6 wt %.

11. The pressurized spray device according to claim 1, wherein the refrigerated fermented dairy product has a pH comprised between 3.8 and 4.75 during all the shelf life of the refrigerated fermented dairy product.

12. The pressurized spray device according to claim 1, wherein the refrigerated fermented dairy product has a Dornic acidity comprised between 85 and 140° D during all the shelf life of the refrigerated fermented dairy product.

13. The pressurized spray device according to claim 1, wherein the refrigerated fermented dairy product has a viscosity comprised between 20 and 1000mPa·s during all the shelf life of the refrigerated fermented dairy product.

14. The pressurized spray device according to claim 1, wherein the pressurized spray device is an aerosol or a food siphon.

15. The pressurized spray device spray device according to claim 1, wherein the pressure in the device is comprised between 6 and 15 bars.

16. The pressurized spray device according to claim 1, wherein the propellant gas is chosen among $N_2$, $N_{20}$, $CO_2$ and mixtures thereof.

17. A method to prepare a pressurized spray device according to claim 1 comprising:
   (1) providing the refrigerated fermented dairy product comprising an emulsifier and a stabilizer, having a temperature of between 0 and 10° C. and having:
      the fat content comprised between 2.5 and 5 wt %, and
      the total protein content comprised between 3 and 10 wt %,
   (2) providing a spray device which is able to be pressurized,
   (3) filling the said spray device with the said refrigerated fermented dairy product, and
   (4) adding the propellant gas to obtain the pressurized spray device.

18. The method according to claim 17, wherein the filling of the spray device with the refrigerated fermented dairy product is done with the fermented dairy product having a temperature of between 2 and 8° C.

19. A method for obtaining a fermented dairy product foam by spraying out the refrigerated fermented dairy product from the pressurized spray device according to claim 1.

* * * * *